ically pure vita-
UNITED STATES PATENT OFFICE 2,442,677

PURIFICATION OF VITAMIN B6

Malcolm L. Brown, Clark Township, Union County, N. J., assignor to Merck & Co., Inc., Rahway, N. J., a corporation of New Jersey No Drawing. Application February 11, 1947, Serial No. 727,945

7 Claims. (Cl. 260—297.5)

This invention is concerned generally with processes for preparing substantially pure vitamin $B_6$ from solutions containing small amounts of the vitamin or from impure dry preparations of the vitamin. More particularly it relates to the preparation of a pharmaceutical grade of high quality vitamin $B_6$ from low assay vitamin preparations which cannot be purified by recrystallization from water, ethanol, or other solvents.

It is now discovered that vitamin $B_6$ can be separated in substantially pure form and in almost quantitative yield directly from crude vitamin preparations containing as low as 20% vitamin $B_6$. This is accomplished by reacting the crude vitamin, in aqueous solution, with boric acid to form the relatively insoluble borate complex of vitamin $B_6$ which crystallizes, is recovered in substantially pure form by filtration and is reconverted to pure vitamin $B_6$ by reaction with an aliphatic alcohol. These reactions may be chemically represented as follows:

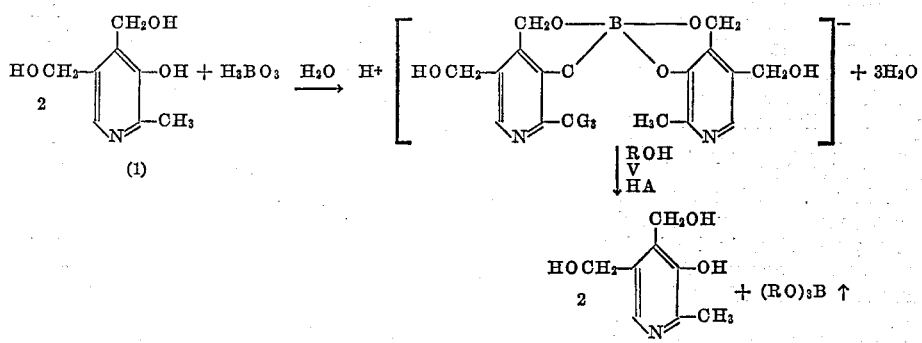

wherein R is an alkyl radical, and HA is a mineral acid.

Although the borate complex of vitamin $B_6$ has been prepared previously, it was not realized that this complex would be an excellent method of purifying the vitamin, nor was any method known for recovering vitamin $B_6$ from said complex. It is particularly unexpected that it is possible to crystallize the borate complex of vitamin $B_6$ in substantially pure form, directly from an aqueous solution of a vitamin preparation which is so impure that vitamin $B_6$ itself, cannot be crystallized therefrom.

It is ordinarily preferred to carry out this novel and improved process using crude vitamin preparations assaying between 59% and 94% vitamin $B_6$ although preparations assaying from about 20% up to nearly 100% may be employed, if desired. The aqueous solution containing the crude vitamin is adjusted to a pH of between 6.7 and 7.5 by the addition of an alkaline material, such as sodium carbonate. This solution is reacted with boric acid and the resulting solution is ordinarily allowed to stand at room temperature for a period of time of about 24 to 48 hrs., during which time the vitamin $B_6$-borate complex precipitates. Cooling to 0° C., the employment of seed crystals, and agitation all accelerate the crystallization process. A quantitative yield of the vitamin $B_6$-borate complex has been obtained three hours after adding the boric acid. In general, the precipitation rate depends on the original purity of the vitamin $B_6$, that is, the higher the assay of the crude material, the faster the precipitation. The pH at which the complex is formed may vary over a range of from about 6.7 to 7.5, although it is preferred to employ a pH between 6.8 and 7.0.

The precipitate which forms is recovered by filtration or centrifugation and washed. The precipitate is then reacted with a lower aliphatic alcohol, preferably under acidic conditions, as for example, with a solution of hydrogen chloride in methanol, a solution of hydrogen bromide in ethanol, a solution of sulfuric acid in propanol, and the like, thus decomposing the borate complex and producing a salt of vitamin $B_6$, admixed with trialkyl borate. The trialkyl borate is conveniently separated from this mixture by distillation; the residual substantially pure salt of vitamin $B_6$ can be isolated as such or if desired can be converted by conventional methods to vitamin $B_6$ base. If desired the complex can be decomposed by reaction with a lower alphatic alcohol alone, but under these conditions the reaction proceeds more slowly since the acidic conditions accelerate the decomposition. The complex is also decomposed by boiling with aqueous alkali; however, the free vitamin base is not very stable in hot aqueous solution, and the decomposition is usually carried out by treatment with an alcoholic mineral acid solution. Although any lower aliphatic alcohol may be used in the decomposition of the borate complex, it is ordinarily preferred to employ methanol, since methanol forms the low-boiling trimethyl borate which is most readily separated from vitamin $B_6$. Thus when the vitamin $B_6$-borate complex is treated with methanolic hydrogen chloride there is obtained a mixture of vitamin $B_6$ hydrochloride and trimethyl borate. This mixture is then distilled to remove the volatile trimethyl borate and the residue is washed with ethanol and filtered to produce substantially pure vitamin $B_6$ hydrochloride.

The following example illustrates a method of carrying out my novel and improved process, but it is to be understood that this example is given by way of illustration and not of limitation.

*Example*

51.1 gms. of vitamin $B_6$ hydrochloride assaying 76% is dissolved in 50 cc. of water to which is added approximately 13.2 gms. of sodium carbonate. The yellow colored solution is filtered and the insoluble material is washed with 10 cc. of water. 6 gms. of boric acid is added to the clear filtrate, which causes the solution to become milky. Four portions of water of 5 cc. each are then added thus producing a clear solution. This solution is allowed to stand at room temperature for two days during which time the borate complex precipitates. The fine white solid precipitate which has formed is filtered and washed with 10 cc. of water. The weight of the dried precipitate is 33.64 gms.

The dried material is treated with 225 cc. methanol and 30 cc. 7 N alcoholic HCl. The mixture is distilled, and, on heating, a white solid separates. The distillation is continued until most of the solvent has distilled off. The distillation is repeated two more times using 225 cc. fresh methanol for each run, and the distillate tested for $(CH_3O)_3B$. The residual vitamin $B_6$ hydrochloride is slurried with cold ethanol, the resulting suspension filtered and the crystalline product washed with cold ethanol, and dried. Weight of the vitamin $B_6$ hydrochloride product is 37.25 g., assay 100%; yield 96.1%. This may be recrystallized if necessary to remove any ash which may be present. The pure vitamin $B_6$ hydrochloride thus obtained can be converted to substantially pure vitamin $B_6$ according to conventional procedures.

Modifications may be made in carrying out the present invention without departing from the spirit and scope thereof, and the invention is to be limited only by the appended claims.

I claim:

1. The process of purifying vitamin $B_6$, which comprises reacting impure vitamin $B_6$ with boric acid to produce a vitamin $B_6$-borate complex, separating said complex in substantially pure form, decomposing said complex by treatment with a lower aliphatic alcohol, and recovering the purified vitamin $B_6$.

2. The process of purifying vitamin $B_6$, which comprises reacting impure vitamin $B_6$ with boric acid to produce a vitamin $B_6$-borate complex, separating said complex in substantially pure form, reacting the substantially pure vitamin $B_6$-borate complex with a lower aliphatic alcohol under acidic conditions to produce the corresponding salt of vitamin $B_6$ in substantially pure form, and recovering the purified vitamin $B_6$.

3. The process which comprises reacting boric acid with an aqueous solution containing impure vitamin $B_6$ to produce a vitamin $B_6$-borate complex, crystallizing the vitamin $B_6$-borate complex, in substantially pure form, directly from the aqueous reaction solution, reacting the substantially pure vitamin $B_6$-borate complex with a lower aliphatic alcohol solution of a mineral acid to produce a mixture containing the corresponding mineral acid salt of vitamin $B_6$ and trialkyl borate, separating the trialkyl borate from said mixture by distillation and recovering the substantially pure salt of vitamin $B_6$.

4. The process which comprises reacting boric acid with an aqueous solution containing impure vitamin $B_6$, at a pH of approximately 6.7 to 7.5, to produce a vitamin $B_6$-borate complex, reacting the substantially pure vitamin $B_6$-borate complex with methanolic hydrogen chloride to produce a mixture of vitamin $B_6$ hydrochloride and trimethyl borate, separating the trimethyl borate from said mixture by distillation, and recovering the substantially pure vitamin $B_6$ hydrochloride.

5. The process which comprises treating a vitamin $B_6$-borate complex with a lower aliphatic alcohol to produce a mixture containing vitamin $B_6$ and trialkyl borate, separating the trialkyl borate from said mixture by distillation, and recovering the vitamin $B_6$.

6. The process which comprises reacting a vitamin $B_6$-borate complex with a lower aliphatic alcohol solution of a mineral acid to produce a mixture containing the corresponding mineral acid salt of vitamin $B_6$ and trialkyl borate, separating the trialkyl borate from said mixture by distillation and recovering said salt of vitamin $B_6$.

7. The process which comprises reacting a substantially pure vitamin $B_6$-borate complex with methanolic hydrogen chloride to produce a mixture containing vitamin $B_6$ hydrochloride and trimethyl borate, separating the trimethyl borate from said mixture by distillation and recovering the substantially pure vitamin $B_6$ hydrochloride.

MALCOLM L. BROWN.